Oct. 22, 1935.  K. R. SHAW  2,018,327
MACHINE FOR USE IN THE MANUFACTURE OF CORDAGE
Filed Feb. 1, 1933  3 Sheets-Sheet 1
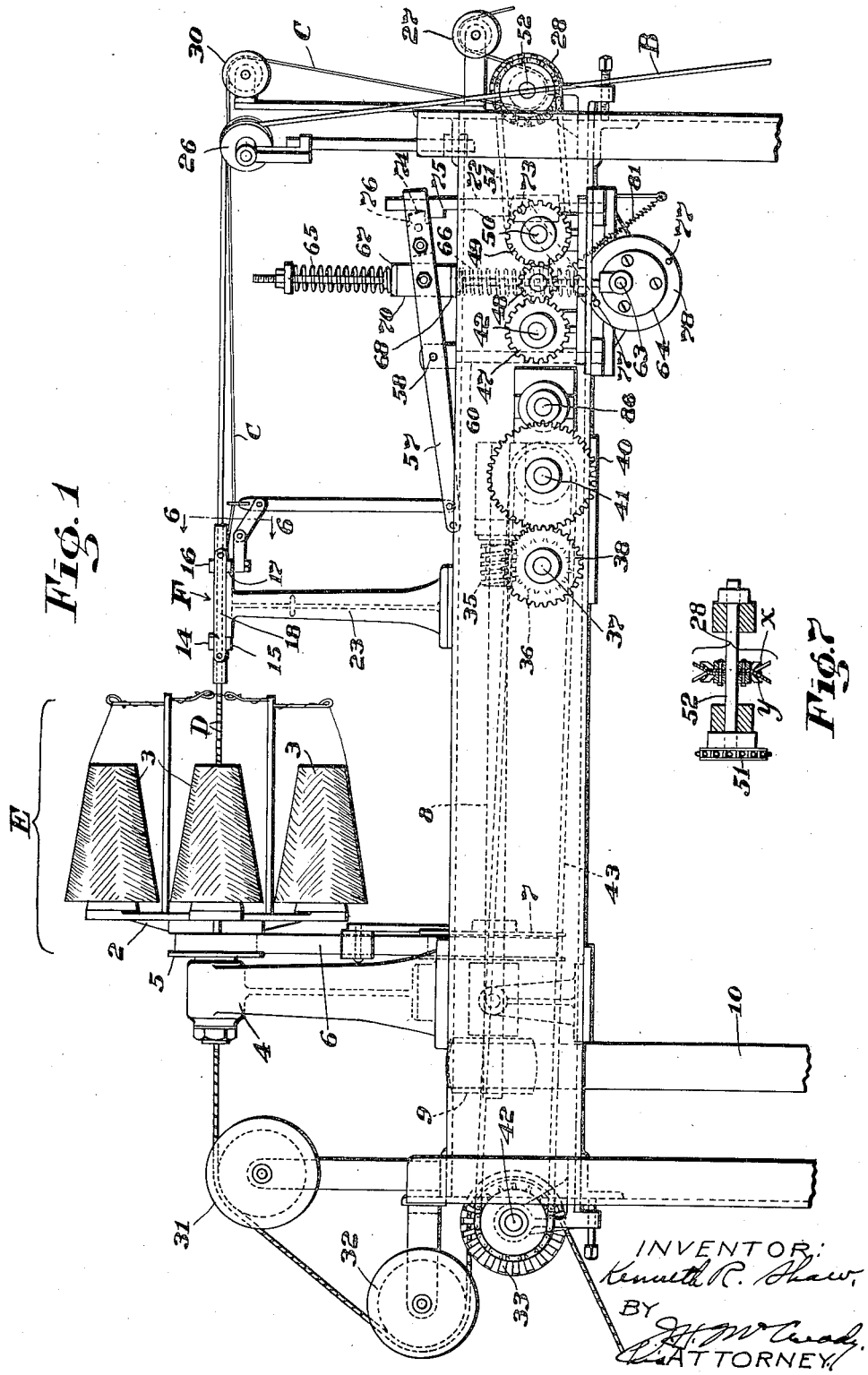

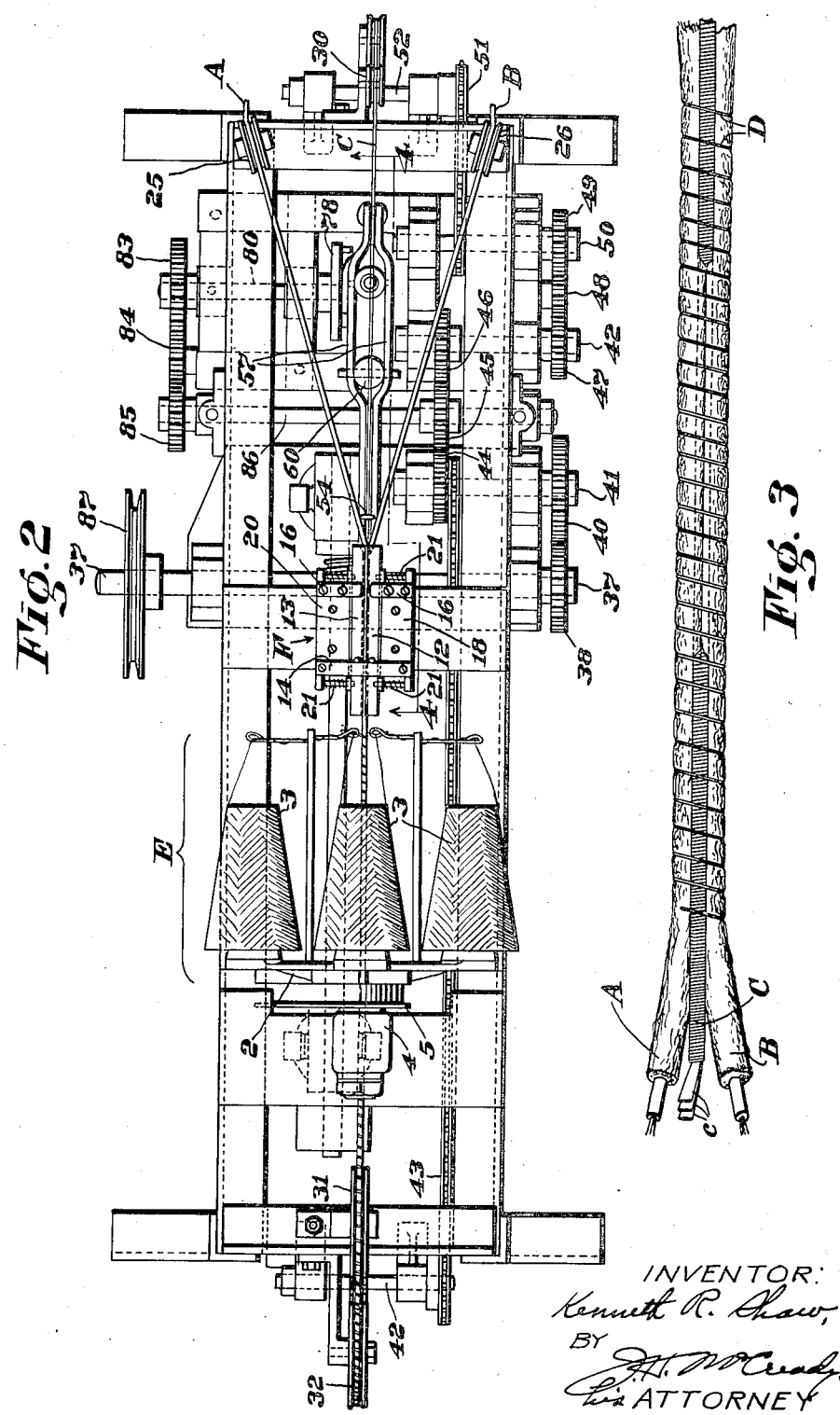

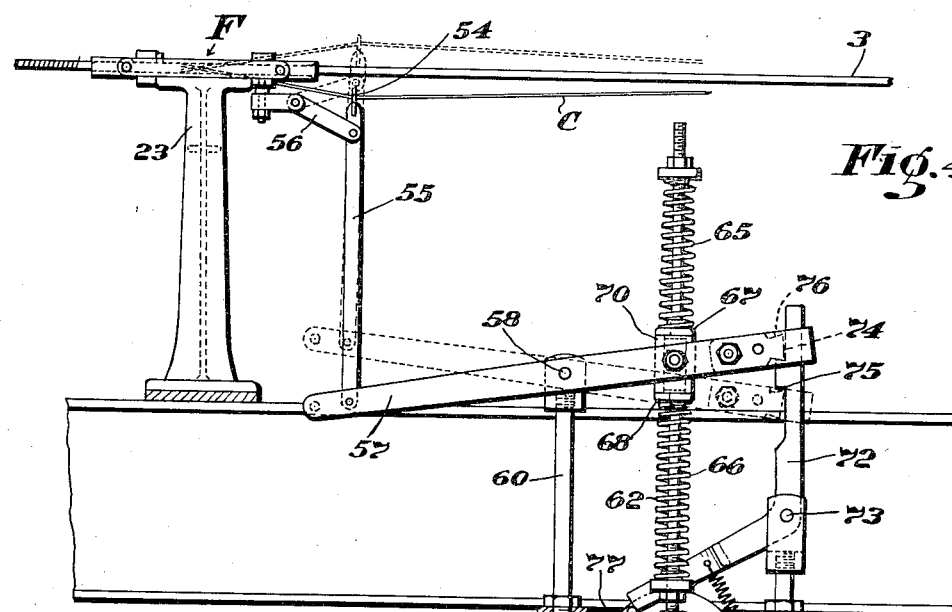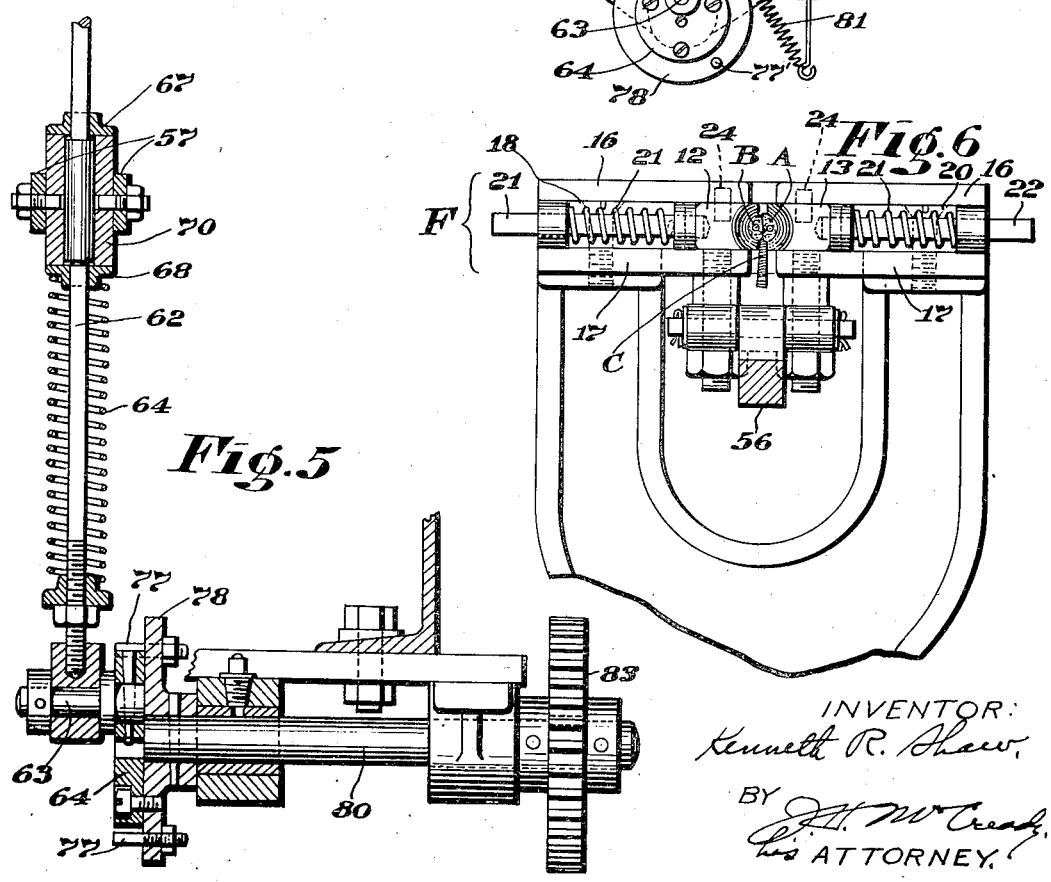

Patented Oct. 22, 1935

2,018,327

UNITED STATES PATENT OFFICE 2,018,327

MACHINE FOR USE IN THE MANUFACTURE OF CORDAGE

Kenneth R. Shaw, Easthampton, Mass., assignor to United Elastic Corporation, Easthampton, Mass., a corporation of Massachusetts Application February 1, 1933, Serial No. 654,665

10 Claims. (Cl. 117—34)

This invention relates to machines for use in making cordage and is more especially concerned with those machines designed to be used in the manufacture of cords or cables in which an elastic element is included.

The invention aims to devise a machine of this general character which will maintain effective control over the elastic element, will associate it with the other elements of the cable in the desired manner, and will give a high rate of production while still being extremely reliable and requiring relatively little attention.

The nature of the invention will be readily understood from the following description when read in connection with the accompanying drawings, and the novel features will be particularly pointed out in the appended claims.

In the drawings,

Figure 1 is a side elevation of a machine constructed in accordance with this invention;

Fig. 2 is a plan view of the machine shown in Fig. 1, certain parts being omitted or broken away in the interest of clearness;

Fig. 3 is a plan view of a short section of the cable produced in the machine;

Fig. 4 is a sectional view approximately on the line 4—4, Fig. 2;

Fig. 5 is a sectional view at right angles to Fig. 4 showing certain details of the mechanism for controlling the elastic element;

Fig. 6 is a sectional view on the line 6—6, Fig. 1; and

Fig. 7 is a detail of the let-off roll.

The machine illustrated in the drawings has been shown as arranged to associate two insulated wires A and B, Fig. 3, with an elastic cord C in a desired manner, such association consisting in so binding the three cord-like members A, B and C together that they will be securely held in the desired positional relationship. In this particular machine the binding operation is performed by winding strands of yarn, thread, or the like, D, around the assembly consisting of the members A, B and C. In some cases the elements of the cable are secured together with the elastic cord always lying at one side of the assembly. At other times it is necessary to shift the elastic cord periodically from one side to the other of the assembly, as shown in Fig. 3, so that predetermined lengths will lie, first on one side and then on the other, of the two conductors A and B. The particular cord C illustrated in Fig. 3 consists of a plurality of flat rubber strips c wound with thread or yarn and commonly known in the trade as "covered rubber", but the nature of this and also of the other cord-like elements will depend upon the requirements of different products and they will be varied in accordance with those requirements.

The machine includes suitable devices for feeding the cord-like elements A, B and C, a wrapping or spinner head E for winding the thread D around the assembled elements, a guiding unit or die F through which said elements pass immediately prior to coming within the range of operation of the spinner head, this die serving to hold the elements in the desired positional relationship for winding, and a take-off mechanism which controls the delivery of the product from the machine.

As shown in Figs. 1 and 2 the spinner head comprises a spider 2 adapted to carry several cops or thread bodies 3, this spider being supported in a bearing bracket 4 for rotation. A pulley 5 is secured to or made integral with the spider and is conected by means of a belt 6, Fig. 1, with a driving pulley 7 which is secured fast on the main shaft 8 of the machine, the shaft being equipped with another pulley 9 connected by a belt 10 to some convenient source of power. This arrangement revolves the spinner head at the desired speed and the threads drawn from the different thread bodies 3 are led through suitable guiding an tensioning devices to the assembly of the cord-like elements which are to be bound together.

As above stated, these elements are guided or positioned for the winding operation by the die F. Referring more particularly to Figs. 1, 2 and 6 it will be seen that this die includes two parallel slidable blocks 12 and 13 supported immediately beside each other and grooved on their adjacent surfaces to provide for the passage between them of the two conductors or cords A and B. A frame supports the blocks 12 and 13 for sliding movement toward and from each other, this frame including upper and lower transverse bars 14 and 15, Fig. 1, extending entirely across the frame at its rearward or left-hand end, and similar bars 16 and 17 at the opposite end, each of the latter bars overlapping the blocks or slides 12 and 13 but having their ends spaced slightly from each other, as best shown in Figs. 2 and 6. These bars hold the slides constantly in the same horizontal plane while permitting them to move toward or from each other. Spacing blocks 18 and 20, made slightly thicker than the slides 12 and 13, are located at opposite sides of the frame and are secured to the bars 14, 15, 16 and 17. The slides are pressed toward each other by four coiled springs 21 arranged in pairs, two at each side of the frame, each spring abutting at one end against a lug projecting from one of the spacing blocks and bearing at its opposite end against a lug projecting from one of the slides 12 or 13. Each spring has a rod 22 extending through it and serving to steady it. A stand 23 supports the entire die structure. When the cords are being fed through this die they exert a backward drag on the slides 12 and 13, and in order to resist this drag each slide has a pin 24 fixed therein and projecting upwardly from it to bear against the upper bar 14.

The two cords A and B are brought to the machine wound on spools, reels, or the like, which are supported in suitable reel stands (not shown) so that they can rotate while the cords are unwound from them. These cords are led over suitable guide pulleys, and if desired through some form of tension mechanism, over guide rolls 25 and 26, Figs. 1 and 2, and they run from these rolls directly to the flared opening at the forward end of the die F. The elastic cord C also is brought to the machine in the same general way and is led over an idle guide pulley 27, Fig. 1, and around a positively driven let-off roll 28 to another guide roll or pulley 30 located in approximately the same horizontal plane with the pulleys 25 and 26. It then runs directly to the guiding die and always lies either above or below the cords A and B and in the space between the adjacent edges of the slides 12 and 13.

The die is so shaped that it maintains the cords A, B and C in this relationship while they travel through it, or at least through that portion of it adjacent to its left-hand end, Figs. 1 and 2, so that these elements leave the die in exactly the desired positional relationship to each other. Immediately after emerging from the die the assembly composed of the cords A, B and C passes into the field of operation of the spinner head which winds the binding thread or yarn D around them, thus holding them definitely in the relationship which they bear to each other when they leave the die. The assembly then passes through the hollow shaft that supports the spider 2, runs over grooved rolls 31 and 32, Fig. 1, and then over a positively driven delivery roll 33.

It is necessary to stretch and elongate the elastic cord C while it is being associated with the other cord-like elements A and B and while all three of these members are being bound together. For this purpose the let-off roll 28 and the delivery roll 33 are constructed to grip the cord passing over them, they are positively connected with each other, and the delivery roll is driven at a speed sufficiently greater than that of the let-off roll to elongate the cord C by the desired amount. In addition, the let-off roll 28 preferably is constructed approximately as shown in Fig. 7 and consists of two sheet metal disks X and Y each having a peripheral series of spring fingers projecting at an angle therefrom, and the two disks are brought together in such a manner that the fingers of one fit into the spaces between the corresponding fingers of the other, with the two sets of fingers crossing each other at an acute angle. A yielding cord running in the groove between these fingers is gripped by them and is held very definitely against slipping. The roll 33 is made in the same manner.

The driving mechanism for these rolls includes a worm 35, Fig. 1, meshing with and driving a worm wheel 36 fast on the transverse horizontal shaft 37. A pinion 38 on this shaft meshes with and drives a gear 40 on another shaft 41, and a sprocket and chain connection between this shaft and the shaft 42 on which the delivery roll 33 is secured drives the latter positively. The chain of this driving connection is indicated at 43. Gears 44, 45 and 46, Fig. 2, connect the shaft 41 with another shaft 42 which, in turn, is connected through change gears 47, 48 and 49 with still another shaft 50 having a sprocket and chain connection, the chain for which is shown at 51, with a shaft 52 on which the let-off roll 28 is secured. The let-off and delivery rolls 28 and 33 thus are positively connected with each other so that a definite speed ratio can be maintained between them.

It will be evident from the foregoing that if the ratio of the gears 38 and 40 is changed by removing them and substituting gears of a different ratio, the relationship between the speed of rotation of the spinner head and the feeding speed of the delivery roll 33 will be correspondingly changed. This, in turn, will effect a change in the number of turns per inch of the windings D on the cable, but such a change will not affect the amount of stretch or elongation given to the elastic cord C. The gears 38 and 40 therefore are made readily changeable. In this connection it should be noted that the entire feeding movement of all three of the elements A, B and C through the spinner head is produced solely by the delivery roll 33.

If it is desired to change the amount of stretch given to the elastic cord, this can be done by changing the speed relationship of the let-off roll 28 with regard to that of the delivery roll 33 and this, in turn, can be done by changing the ratio of the gears 47, 48 and 49.

The machine so far described is very useful in making self-coiling cables in which the coiling action is produced by the contracting effort exerted by the elastic cord C. This cord, being located at one side of the neutral axis of bending of the entire assembly, tends to shorten when allowed to do so, and thus to coil the entire cable. If, instead of having the elastic cord located always at one side of the neutral axis of bending of the cable, the elements of the cable are relatively moved so that the cord is shifted periodically from one side to the other, then the contracting force of the cord will serve to fold the conductor into reversely disposed loops, or, in other words, into a form somewhat like a figure 8. An important feature of this invention resides in an arrangement for accomplishing this object.

Referring more especially to Figs. 4 and 5 it will be seen that the elastic cord C is led through a guiding eye 54 projecting from the upper end of an approximately upright link 55. The upper end of this link is pivotally connected by another link 56 with a part rigidly secured to the frame of the die F, as best shown in Fig. 6, this connection being provided for the purpose of guiding the movements of the upper end of the link 55. At its lower end the latter link is pivoted on one end of a lever 57 which is fulcrumed at 58 on an upright post 60, the lever being of the split or divided type, as shown in Fig. 2, so that it straddles said post. A mechanism is provided for the purpose of operating this lever which serves to hold the lever normally in either its upper or lower position and is arranged to move it abruptly from one of said positions to the other. This mechanism comprises a pitman rod 62 projecting through the lever 57, as best shown in Fig. 5, and pivoted at its lower end on an eccentric pin 63 projecting from the face of a rotary disk 64. Encircling the pitman rod 62 are two coiled springs 65 and 66, one located above and the other below the lever 57. Each spring is backed up by a nut secured on the rod and the two ends of the springs adjacent to the lever bear, respectively, on upper and lower collars 67 and 68. Between them is located a sleeve 70 which is freely slidable on the pitman rod but is pivoted to the lever 57. Located loosely between the two members of the lever at its right-hand end, Fig. 4, is the upright portion of a latch 72 which consists of a bell crank lever, fulcrumed at 73 on a stationary part of the machine frame, and provided with upper and lower notches 74 and 75, respectively, both adapted to receive a stop 76 that is secured rigidly to the lever 57. The lower end of this lever is arranged to engage with either one of two pins 77 or 77' which project from the face of a collar 78 to which the disk 64 is secured, the collar being fastened to and revolving with the horizontal shaft 80, Fig. 5. A coiled spring 81 connected to the lower end of the latch 72 tends to hold this latch in engagement with the stop 76 and in position to be operated by either of the pins 77.

It will be evident from an inspection of Fig. 4 that when the parts are in the positions there shown the lever 57 will be held in such a position as to maintain the guiding eye 54 at the lower limit of its range of movement. Assuming that the collar 78 and disk 64 are being revolved in the direction indicated by the arrow, the pitman rod will gradually be lowered, thus placing the upper spring 65 under compression. The lever 57 at this time is prevented from moving downwardly by its engagement with the latch 72. When the collar 78 has made nearly a half revolution, the pin 77' will engage the lower side of the latch 72, thus swinging the latch in a clockwise direction far enough to release the stop 76. As soon as the stop is freed, the spring 65 immediately snaps the lever 57 into the position in which it is shown in dotted lines in Fig. 4, thus raising the guiding eye 54 to the upper limit of its stroke. Prior to this time the cord C was running into the die F below the cords A and B. The shifting movement of this eye produced in the manner just described raises the cord C to a position above that of the cords A and B. As soon as this action occurs the lever is locked in its new position by the latch 72 where it remains until the latch is again released by the other pin 77, whereupon a reverse movement of the lever occurs and the guide eye 54 will again be returned to its lowermost position. Such reversals continue so long as the machine remains in operation, with the result that the elastic cord C is shifted periodically from the upper to the lower side of the cords A and B and vice versa. All three elements A, B and C are bound together in the positions which they occupy when they leave the die F.

For the purpose of driving the reversing mechanism just described in a positive and definite relationship to the other operations of the machine, the shaft 80 is connected through gears 83, 84 and 85, Fig. 2, with the shaft 86 on which the gear 45, previously referred to, is secured. The latter gear is a part of the chain of mechanism through which the let-off roll 28 is driven, and, as above stated, is positively connected with the delivery roll 33 which feeds the cords through the machine. Consequently, by changing the ratio of the gears 83 and 85 to each other, the relation between the rate of feed and the number of reciprocations of the guide eye 54 can be changed. This arrangement, therefore, provides for the convenient variation, as desired, of the lengths of the sections of the elastic cord C that lie above and below the companion cords A and B. In other words, this change gear arrangement provides for the convenient adjustment of the periodicity of the operation of the mechanism for reversing the elastic cord.

In some cases it may be desirable to positively drive one or more of the supply reels, and for this purpose a pulley 87, Fig. 2, is secured to the projecting end of the shaft 37 where it may conveniently be belted to a suitable operating element of the reel stand.

From the foregoing it will be seen that the invention provides a machine which constantly maintains effective control over the positions and movements of the elements A, B and C and which automatically changes the relationship of these members when required and at the desired times. The machine is extremely reliable in operation and therefore requires little attention on the part of the operator other than to keep it supplied with the necessary materials and to take away the product.

In making the particular product shown in Fig. 3 of the drawings, it is customary to braid a jacket around the assembly of cords illustrated in said figure. It is entirely possible, however, to place the windings D so closely together that they will form the outer cover which ordinarily consists of a braided jacket. By making only very minor changes in the arrangement disclosed, the machine could be made to put on other types of flexible coverings. For example, it could be made to wrap a tape around the cords, such a tape being either impregnated with rubber, or some other material, or left unimpregnated, as desired, and subsequently being impregnated or treated in any suitable manner if found desirable. It is also contemplated that the binding of the cords in their associated relationship could be performed in other ways, as for example by substituting a braider for the spinner head.

The machine has been described more particularly in connection with the manufacture of a self-coiling or self-folding cable for conducting electric currents, but it is obvious that it is equally useful in the manufacture of non-conducting cables. In such an event, non-conducting strands would be substituted for those shown at A and B, and the number of these strands may be varied in accordance with the requirements of the particular product being manufactured. In fact, in making electrical conducting cables it is also necessary for these reasons to change the number of the conductors in the cable. For example, the particular cable shown is of the general type used in connection with flat irons, vacuum cleaners, electric toasters, and the like, but the cords or cables used on telephones include three conductors, while those made for other purposes have four, or some other number. The machine is equally useful in making conductors of the latter types. For the three conductor telephone cable or cord the three wires are run through a die side by side, the die usually being solid instead of split, as in the construction above described, and two elastic cords are used, one between each adjacent pair of wires. These two elastic cords run through guiding eyes like that shown at 54 in the reversing mechanism, and they are moved up and down at the desired periods by a mechanism like that above described. In this case, as well as in that where four conductors are used, the wires are regarded as arranged in pairs and an elastic cord is associated with each pair. The machine may also be adapted to the handling of various other arrangements.

While I have herein shown and described a preferred embodiment of my invention, it will be understood that this invention may be embodied in other forms without departing from the spirit or scope thereof.

Having thus described my invention, what I desire to claim as new is:

1. In a machine of the character described, the combination of mechanism for feeding a plurality of cord-like members, one of which is of an elastic nature, means for guiding said members while they are so fed to hold them in a side by side relationship to each other, mechanism for holding said elastic member in a stretched and elongated condition while it is so fed, means for wrapping a flexible element around all of said members to bind them together while they are held in said relationship and while they are being so fed, and mechanism for periodically shifting said elastic member relatively to the other member or members with which it is associated while said binding operation continues uninterruptedly.

2. In a machine of the character described, the combination of mechanism for feeding a plurality of cord-like members, one of which is of an elastic nature, means for guiding said members while they are so fed into a side by side relationship to each other with said elastic member at one side of the assembly so formed, mechanism for manipulating one or more binding threads to secure said members together while they are being so fed, and means for periodically shifting said elastic member from one side to the other of said assembly while said feeding and binding operations continue uninterruptedly.

3. In a machine of the character described, the combination of mechanism for feeding a plurality of cord-like members, one of which is of an elastic nature, means for guiding said members while they are so fed to hold them in a side by side relationship to each other with said elastic member at one side of the assembly so formed, mechanism for holding said elastic member in a stretched and elongated condition while it is so fed, means for periodically shifting said elastic member from one side to the other of said assembly while said feeding operation continues uninterruptedly, and mechanism for wrapping a flexible element around said members during said feeding movement to bind said stretched elastic member to the other member or members to hold them in the relationship in which they have been so positioned.

4. In a machine of the character described, the combination of mechanism for feeding a plurality of cord-like members, one of which is of an elastic nature, means for holding said members in juxtaposed relation to each other with said elastic member at one side of the cable formed by said assembled members, mechanism for holding said elastic member in a stretched and elongated position while it is so fed, mechanism for wrapping a flexible element around said members to bind them together while said elastic member is in its stretched condition, and a reversing mechanism for automatically shifting said elastic member periodically from one side to the other of said cable before said members are bound together and while said feeding operation continues uninterruptedly.

5. In a machine of the character described, the combination of mechanism for feeding a plurality of cord-like members, one of which is of an elastic nature, means for holding said members in juxtaposed relation to each other with said elastic member at one side of the cable formed by said assembled members, mechanism for holding said elastic member in a stretched and elongated position while it is so fed, mechanism for wrapping a flexible element around said members to bind them together while said elastic member is in its stretched condition, and a reversing mechanism for automatically shifting said elastic member periodically with a snap movement from one side to the other of said cable prior to the action thereon of said binding mechanism and while said feeding and binding operations continue uninterruptedly.

6. In a machine of the character described, the combination of mechanism for feeding a plurality of cord-like members, one of which is of an elastic nature, means for holding said members in juxtaposed relation to each other with said elastic member at one side of the cable formed by said assembled members, mechanism for holding said elastic member in a stretched and elongated position while it is so fed, mechanism for wrapping a flexible element around said members to bind them together while said elastic member is in its stretched condition, a reversing mechanism for automatically shifting said elastic member periodically from one side to the other of said cable before said members are bound together and while said feeding operation continues uninterruptedly, and means whereby the frequency of operation of said reversing mechanism with reference to the rate of said feeding movement can be varied.

7. In a machine of the character described, the combination of mechanism for feeding a plurality of cordlike members, one of which is of an elastic nature, means for guiding said members while they are so fed to hold them in a side by side relationship to each other, said means being of a yielding nature so that said members can be relatively shifted to change their positions while the machine continues in operation, mechanism for holding said elastic member in a stretched and elongated condition while it is so fed, and means for wrapping a flexible element around all of said members to bind them together while they are held in said relationship and while they are being so fed.

8. In a machine of the character described, the combination of mechanism for feeding several cord-like members, one or more, but not all of which, are of an elastic nature, mechanism for holding the elastic member or members in a stretched and elongated condition while they are so fed, means for guiding said members while they are so fed to hold them in a definite and assembled relationship to form a cable-like structure, but permitting a relative shifting of said members to effect a change in their positional relationship to each other while the machine continues to operate uninterruptedly, and mechanism operable to wrap a flexible element around all of said members while they are being so fed to bind them together in their assembled relationship.

9. In a machine of the character described, the combination of mechanism for feeding several cord-like members, one or more, but not all of which, are of an elastic nature, mechanism for holding the elastic member or members in a stretched and elongated condition while they are so fed, means for guiding said members while they are so fed to hold them in a definite and assembled relationship to form a cable-like structure, mechanism for wrapping a flexible element around all of said members while they are so fed to bind them together in said assembled relationship, and mechanism for relatively shifting said members to change the positional relationship of said elastic member or members with reference to the other members in a predetermined manner and at predetermined times while the machine continues to operate uninterruptedly.

10. In a machine of the character described, the combination of mechanism for feeding a plurality of cord-like substantially non-elastic members together with a longitudinally elastic cord-like member, a die for guiding said members while they are so fed to assemble them in a parallel relationship to form a cable-like structure, said die having parts cooperating to yield toward and from each other and including springs for holding said parts pressed upon said assembly, said die being constructed to guide said elastic member along one side of said assembly but displaced from the neutral axis of bending of said cord-like structure, mechanism for holding the elastic member in a stretched and elongated condition while it is so fed and assembled with the other parts, and mechanism for wrapping a flexible element around all of said members while they are being so fed and while said elastic member is held stretched to bind them together and to hold them substantially in the relationship into which they have been guided by said die, whereby said elastic member will serve, when allowed to contract after the completion of the cable, to bend said cable into a looped condition.

KENNETH R. SHAW.